United States Patent [19]
Roige

[11] Patent Number: 4,538,378
[45] Date of Patent: Sep. 3, 1985

[54] PLANT CONTAINER

[76] Inventor: Luis C. Roige, Lauria, 147, Barcelona, Spain

[21] Appl. No.: 617,147

[22] Filed: Jun. 5, 1984

Related U.S. Application Data

[63] Continuation of Ser. No. 396,324, Jul. 8, 1982, abandoned.

[30] Foreign Application Priority Data

Jul. 15, 1981 [ES] Spain ................................. 259 491

[51] Int. Cl.³ .............................................. A01G 9/02
[52] U.S. Cl. ............................................ 47/72; 47/81
[58] Field of Search ........................... 47/66, 79–81, 47/72

[56] References Cited

U.S. PATENT DOCUMENTS

| | | | |
|---|---|---|---|
| 804,809 | 11/1905 | Graham | 16/19 |
| 3,475,858 | 11/1969 | Flannigan | 47/66 |
| 3,576,088 | 4/1971 | Arca | 47/81 |
| 3,676,953 | 7/1972 | Delogne | 47/81 |
| 4,143,487 | 3/1979 | Hollvarth | 47/59 |
| 4,270,309 | 6/1981 | Baumann | 47/79 |

FOREIGN PATENT DOCUMENTS

| | | | |
|---|---|---|---|
| 1395186 | 3/1965 | France | 111/81 |
| 1468716 | 2/1967 | France | 47/79 |
| 1098155 | 1/1968 | United Kingdom | |

OTHER PUBLICATIONS

Anon. (Oct. 1976) Advertisement, "The Self-Watering Planter with Beauty . . . and Brains", Grosfillex (France) also, London Garden Associates Ltd., Ridgefield, CT 06877, (taken from *Horticulture*, vol. LIV, No. 10, page unknown).

Primary Examiner—James R. Feyrer

[57] ABSTRACT

A plant container having a peripheral step thereon defining a base and a pair of soil bearing plates resting on the peripheral step and defining with the base a water containing space below the plates. The base has a plurality of peripheral raised sections in the shape of truncated cones disposed at a regular spacing and of a height equal to the peripheral step on the body and a raised section in the central area of the base having a height equal to the peripheral raised sections to respectively support interior portions and contiguous edges of the plates.

2 Claims, 4 Drawing Figures

PLANT CONTAINER

This application is a continuation of application Ser. No. 396,324, filed July 8, 1982, now abandoned.

This present Patent relates to a plant container of the type utilized for decorative and for functional purposes with the object of containing live plants and providing for their sustenance, employed in the decoration of interiors, halls, waiting rooms and the like, though due to its characteristics it can be used outside.

The plant container herein to be described differs from current known types in the improvements that it offers and among which can be cited the ease of refilling with water, the simplicity of the water level indicating device, the ease with which it may be moved along the floor and the aesthetic appearance that it presents.

In order to facilitate the explanation thereof there are drawings accompanying this specification in which is shown one illustrative though not limitative embodiment of an improved plant container, in accordance with the principles stated in the claims.

Figure 1:
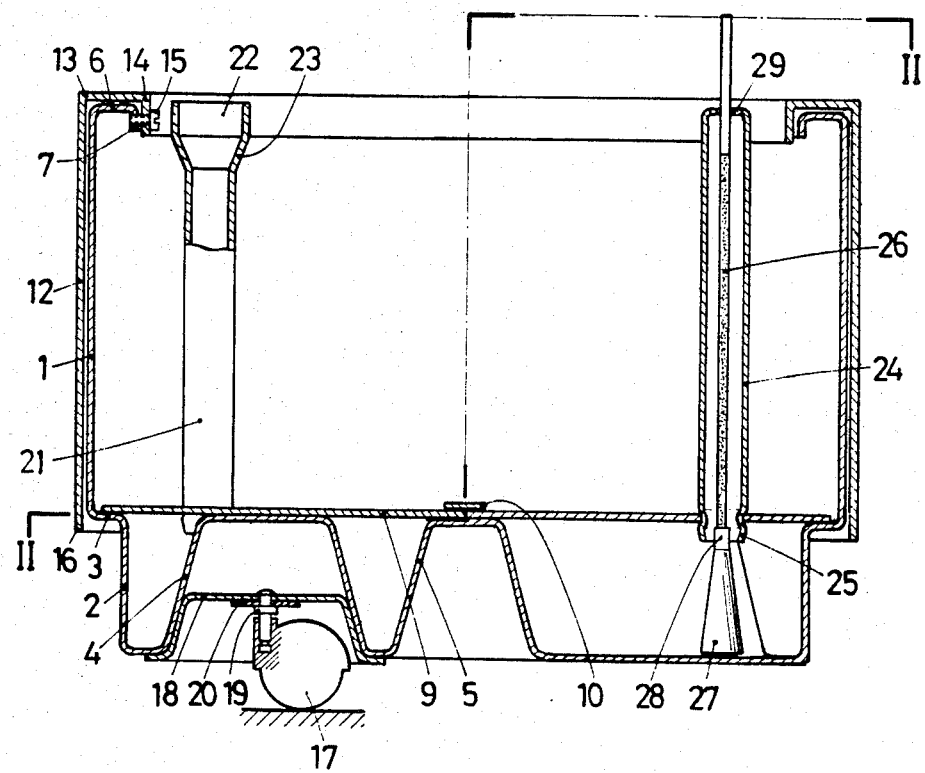
FIG. 1 is a view in elevation of the new plant container along a vertical plane in section indicated as I—I in the FIG. 2, the latter being a plan view in section along the horixontal plane II—II.
Figure 2:
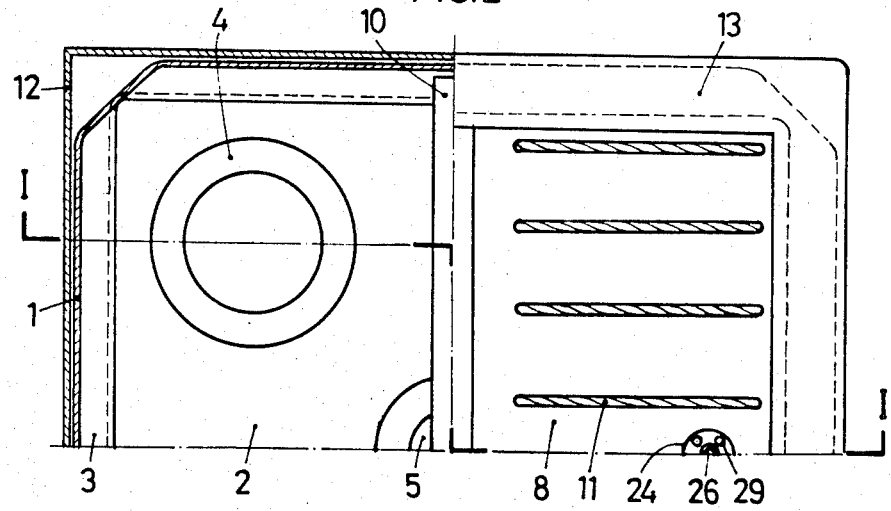
Figure 3:
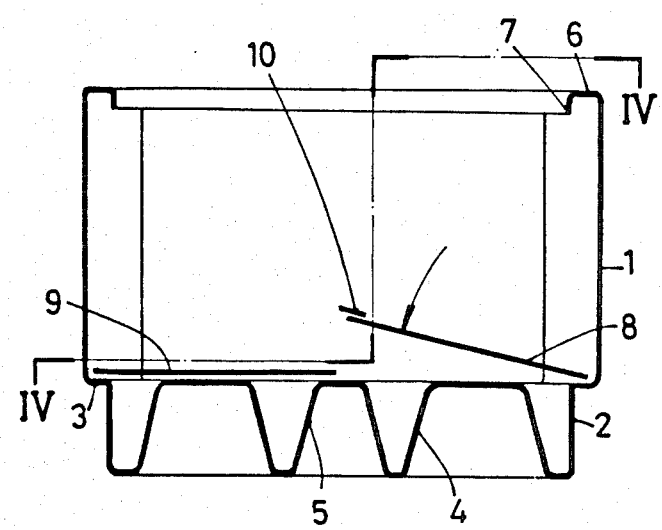
FIGS. 3 and 4 are also views in elevation and plan, taken along the secondary planes III—III and IV—IV respectively, showing the new ornamental plant containing device as to its layout.
Figure 4:
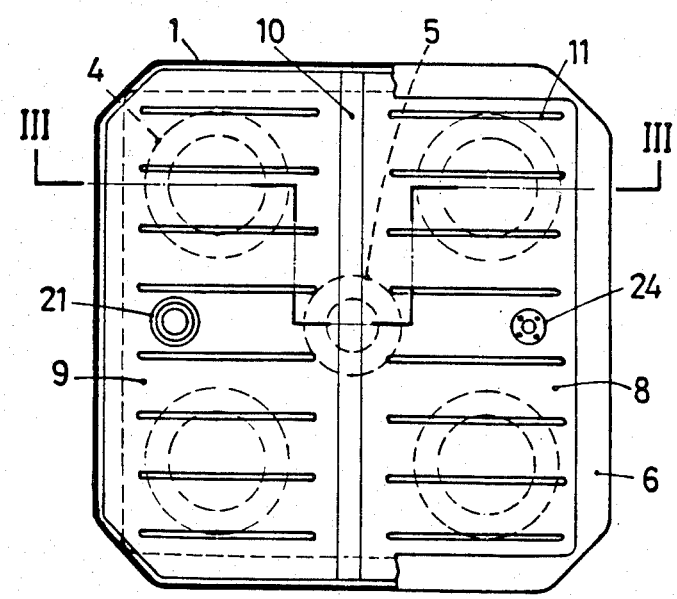

The numbered items as shown in the drawings correspond to the parts referred to below.

The body 1, in the shape of a box can be of any geometric configuration, as for example, circular, square or rectangular and at its lower part forms a base 2, defined by a re-entrant periphery 3, of lesser width. The base has formed therein a plurality of raised sections 4, these being for preference of a truncated cone shape and being disposed on a regular spacing around the periphery, there being also in the central area at least one raised section 5, which may be of a different width but having a height no greater than the others.

Around its opening the body 1, can with advantage be provided with a re-entrant member 6 and a rim 7 for purposes of strengthening and embellishment.

The plates 8 and 9 are for supporting the soil for the plants and together take the shape and the dimensions corresponding to those of the straight section of the body 1, as defined by the re-entrant member 3. These said plates can be introduced easily through the upper opening of the body 1, and are then juxta positioned with their central edges coincident, the strip 10 being in that position over both plate edges. This central part rests on the central raised section formed from the base, 5, this resulting in good stability of the plates 8 and 9, thus avoiding their distortion due to the effect of the weight of the soil which is resting thereon.

The items 11 are absorbent wicks of which the extremities are submerged in the volume of water contained in the base of the vessel, that is to say within the space formed by the base 2 and beneath the plates.

The body 1, may appear as it in fact is or on the other hand may be enveloped by a wrap-round made from sheet 12 to a suitable shape, in a material with acceptable aesthetic properties, such as stainless steel. At its upper part the envelope has a flanged rim 13 and a re-entrant member 14 corresponding respectively with the parts 6 and 7 of the body 1, being attached to each other by means of screws, 15 horizontally, at the opening. The skirting 16 on the other hand projects slightly below the level of step 3 formed by the body 1.

The new plant container can be fitted with wheels 17 which are affixed to components 18 these being in the form of dishes having the shape of truncated cones the same being inserted in the lower deep openings of the raised sections 4, the pins 19 and the discs 20 providing their attachment, the wheels having the possibility of pivoting.

The vertical tube 21, of which the upper mouth 22 of a greater diameter is attached thereto by the truncated cone section 23, is used for the introduction of water into the plant container.

The level gauge 24 is attached by its foot 25 to one of the plates 8 and this houses the rod 26 vertically, the lower float thereof 27 being preferably in the shape of a truncated cone with its cylindrical head 28, this shape being suitable to conform to the extremity 25 of the vertical tube. The head of this tube is provided with orifices 29 around the central hole through which protrudes the rod at its upper end.

All which does not affect, alter change or modify the essence of the plant container described herein will be a variable for purposes of this Patent.

It is claimed:

1. A plant container comprising a container body, a peripheral shoulder in a lower portion of said body extending inwardly of said body and defining a base, a pair of like plates each having a shape and a dimension corresponding to approximately half of the interior shape and dimension of said body, said plates being disposed in said body for supporting plant soil on an upper surface thereof, said plates each having a width and both of said plates resting on said peripheral shoulder of said body and having edges contiguous to each other, said base comprising a water containing space beneath said plates and being provided with a plurality of peripheral raised sections having the shape of truncated cones disposed at a regular spacing generally about the periphery of said body and all having essentially equal heights to provide support for interior portions of said plates, said peripheral raised sections having deep openings on the underside thereof of a height and width to accommodate wheel supports therein, a wheel support in the form of a truncated cone inserted in at least some of said deep openings of said peripheral raised sections without any other means of attachment and a wheel fixed to said truncated cone, and a raised section in the central area of said base having a height equivalent to the peripheral raised sections of said base to provide a support for said contiguous edges of said plates, an opening defining means in said body, said opening defining means including a reentrant portion extending inwardly of said body and having a vertically downwardly extending flange on an inner edge thereof, said reentrant portion having a size approximately equal to the size of said shoulder, a stip member overlying said plate contiguous edges, a plurality of absorbant wicks on each of said plates, said wicks being spaced apart and extending along the width of said plates for a distance less than the width of said plates and being positioned so that wicks on one plate are aligned with wicks on the contiguous plate, an envelope surrounding said body, said envelope including a body portion extending adjacent to said body and having a skirting portion extending downwardly beyond said shoulder and a reentrant section located adjacent to said body reentrant portion and a flange section connected to said reentrant section to extend vertically downwardly adjacent to said body flange, attaching means attaching said envelope flange section to said body flange, a tubular pipe for the admission of water to said water containing space having a head of cylindrical shape of a diameter greater than the diameter of said pipe, a truncated cone shaped section connecting said head to said pipe, a vertical tubular body inserted through one of said plates, a rod having a level indicator float at a lower end thereof inserted through an orifice in said vertical tubular body, said float being in the shape of a truncated cone, and a cylindrical portion of said float attached to a lower end of said rod.

2. The plant container defined in claim 1 wherein said envelope is formed of stainless steel.

* * * * *

UNITED STATES PATENT AND TRADEMARK OFFICE
CERTIFICATE OF CORRECTION

PATENT NO. : 4,538,378
DATED : September 3, 1985
INVENTOR(S) : Luis C. Roige

It is certified that error appears in the above-identified patent and that said Letters Patent are hereby corrected as shown below:

On the title page Item /76/ should read
-- [76] Inventor: Luis CABRE ROIGE, Lauria 147,
                  Barcelona, Spain --.

*Signed and Sealed this*

*Twenty-first* Day of *January 1986*

[SEAL]

*Attest:*

DONALD J. QUIGG

*Attesting Officer*     *Commissioner of Patents and Trademarks*